(12) United States Patent
Chahl et al.

(10) Patent No.: US 6,501,537 B1
(45) Date of Patent: Dec. 31, 2002

(54) RANGE FINDING (75) Inventors: Javaan Singh Chahl, Curtin; Mandyam Veerambudi Srinivasan, Florey, both of (AU)

(73) Assignee: The Australian National University, Acton (AU)

( * ) Notice: Subject to any disclaimer, the term of this patent is extended or adjusted under 35 U.S.C. 154(b) by 0 days.

(21) Appl. No.: 09/485,863

(22) PCT Filed: Aug. 19, 1998

(86) PCT No.: PCT/AU98/00658

§ 371 (c)(1),
(2), (4) Date: May 19, 2000

(87) PCT Pub. No.: WO99/09373

PCT Pub. Date: Feb. 25, 1999

(30) Foreign Application Priority Data

Aug. 19, 1997 (AU) .......................................... PO 8657/97

(51) Int. Cl.[7] .............................. G01C 5/00; G01C 3/08; G01C 17/00; G06K 9/00
(52) U.S. Cl. ...................... 356/3.14; 382/106; 702/152; 356/4.01
(58) Field of Search ........................ 356/3.14; 382/106; 702/155, 152, 153

(56) References Cited

U.S. PATENT DOCUMENTS

| | | | |
|---|---|---|---|
| 3,706,493 A | 12/1972 | Redmann | 356/4 |
| 4,573,191 A | * 2/1986 | Kidode et al. | 382/42 |
| 4,589,770 A | 5/1986 | Jones et al. | 356/1 |
| 4,601,053 A | 7/1986 | Grumet | 382/1 |
| 4,606,630 A | 8/1986 | Haruki et al. | 356/1 |
| 6,023,588 A | 2/2000 | Ray et al. | 396/20 |
| 6,118,475 A | * 9/2000 | Iijima et al. | 348/42 |

* cited by examiner

Primary Examiner—Stephen C. Buczinski
(74) Attorney, Agent, or Firm—Robert Iannucci; Seed IP Law Group PLLC (57) ABSTRACT

A method and apparatus for determining the range of an object. A first image of at least a portion of the object viewed from a first position is generated. A second image of the portion viewed from a second position spaced apart from the first position is generated by calculation from the first image and the distance between the first and second position. It is assumed that all of the portion represented by the first image lies on a radius less than the distance to the object. A third image of the portion viewed from the second position is generated and the range determined by comparison of the first and third images.

18 Claims, 12 Drawing Sheets

Image captured by camera

*Fig. 2A*

Image computed after a Simulated Shift of the camera by S units assuming the environment is on the hypothetical image plane H

*Fig. 2B*

Image captured after a real shift of the camera by S units

RANGE FINDING

FIELD OF THE INVENTION

This invention relates to a method and apparatus for determining the range of an object from an image of the object or a space containing the object.

BACKGROUND ART

There are a number of applications in which it is desirable to determine the range of a an object from an image of the object or a space containing the object. One application is in the area of mobile robot navigation.

In most applications for range determination from images, the range is required to be estimated from a panoramic image. A number of methods exist for capturing panoramic images using conventional cameras. These include rotating a camera about a vertical axis so as to obtain an image or by using multiple cameras looking in different directions. These techniques have a high level of complexity and require a large amount of equipment. International patent application number PCT/AU94/00501 (publication number WO95/06303) by the present applicant discloses a panoramic imaging system utilising a single camera and a dome like convex mirror. International patent application PCT/AU97/00815 (publication number WO 98/25245) by the patent applicant discloses an improved panoramic imaging system utilising a single camera and a reflective surface shaped such that the area occluded by the camera is constant or decreases with increasing distance. The disclosure of international application number PCT/AU94/00501 and international patent application number PCT/AU97/00815 are incorporated in this specification by cross reference.

Estimation of range from an image can be achieved in a number of ways many of which involve a comparison of images resulting from a known displacement in some known direction. Various algorithms exist for range computation using two paraxial cameras. This is equivalent to using a single camera to capture images from two different locations and comparing the resulting images. Measurement of range using wide angle imaging has been used in relation to some machine vision. Some systems have utilised a series of motion detectors arranged at different angles to form a panoramic sensor. The detectors are scaled to the amplitude of motion seen at different angles by using detectors tuned to different velocities. This type of arrangement has been used on a mobile robot to provide the depth information to navigate and avoid collisions. A difficulty with this approach is that the motion detectors have narrow fields of view and cannot individually detect complex fields.

Arrangements in which panoramic sensors provide information to an algorithm that tracks the position of features during motion of a mobile robot are known. Using a knowledge of the motion of the features, the range to those regions of image can be determined. This approach suffers from a strong dependence on the feature selection and registration algorithms.

DISCLOSURE OF THE INVENTION

It is an object of this invention to provide an improved method and apparatus for determining range of an object from an image of the object or a space containing the object.

Accordingly, in one aspect this invention provides a method of determining the range of an object including the steps of generating a first image of at least a portion of the object viewed from a first position, producing a second image of said portion viewed from a second position spaced apart from the first position by calculation from said first image using the distance between said first and second positions and assuming all of the portion represented by said first image lies on an arc of constant radius less than the distance to the object, generating a third image of the portion viewed from said second position, and determining the range of the object by comparison of said second and third images.

In a second aspect this invention provides an apparatus for determining the range of an object including means to generate a first image of at least a portion of the object viewed from a first position, calculating means to produce a second image of said portion viewed from a second position spaced apart from the first position by calculation from said first image using the distance between said first and second positions and assuming all of the portion represented by said first image lies on an arc of constant radius less than the distance to the object, means to generate a third image of the portion viewed from said second position, and comparator means to determine the range of the object from said second and third images.

Preferably, the first and third images are generated by moving the effective position of the image generator from the first position to the second position. In an alternative approach two separate image generators of identical configuration can be used at each of the first and second positions.

The first and third images are preferably generated using a panoramic imaging system. More preferably, the panoramic imaging system is of the type described in international patent application number PCT/AU94/00501 or international patent application number PCT/AU97/00815.

Preferably, the images are a circular array representing an image space around a horizon. More preferably, the image is a one dimensional array of pixels that represent intensity in equally spaced regions around a horizon. The regions are preferably slightly overlapping.

In one form of the invention, the determination of range is made from a comparison of the deformation between the second and third images using the relationship that local image deformation is inversely proportional to range.

In another form of the invention, the local optical flow, that is, local angular image translation, is determined from the first and second images and the range determined by triangulation.

As used throughout this specification the term "image" is used to refer to all forms of representation and storage of images by digital or other techniques. Consequently reference to comparison, calculation and other operations with images includes the corresponding manipulation of data indicative of the image whether or not the image is visually displayed at any time.

The invention will now be described, by way of example only, with reference to the accompanying drawings:

BRIEF DESCRIPTION OF THE DRAWINGS

FIG. 5 shows mapping of a fitter of constant size onto different transformations of images;

BEST MODES FOR CARRYING OUT THE INVENTION

Two panoramic images taken from different positions provide different views of the environment. The amount of shift of objects in the image is inversely proportional to the distance of the object from the position that the images were captured. For practical purposes the two images can either be captured by two identical panoramic optical configurations at different locations, or by a single panoramic imaging system that is moved in the time interval between the capturing of the two images.

Figure 1A:
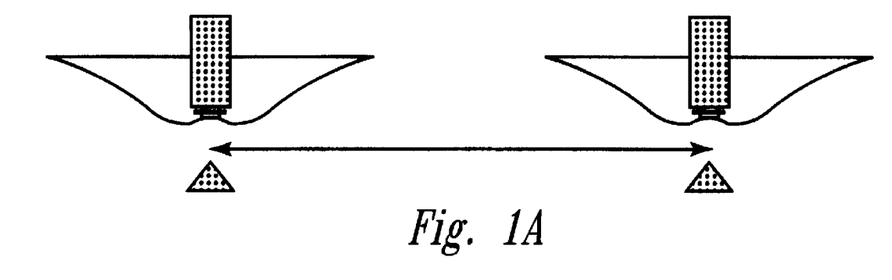
FIGS. 1A to 1G illustrate a number of optical surfaces and camera configurations that can be used to allow range computation according to this invention.
Figure 1B:
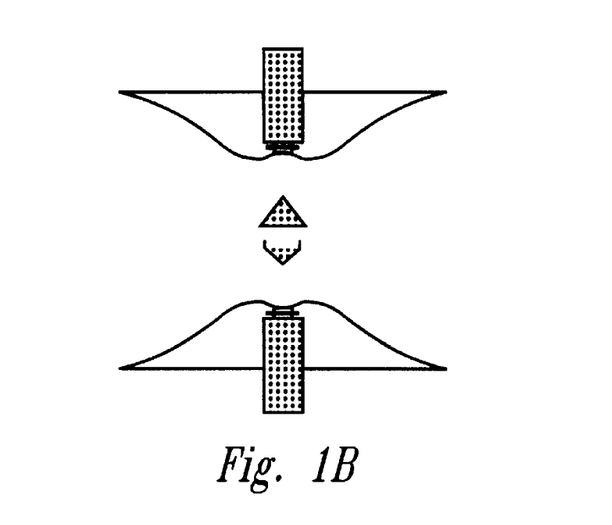
Figure 1C:
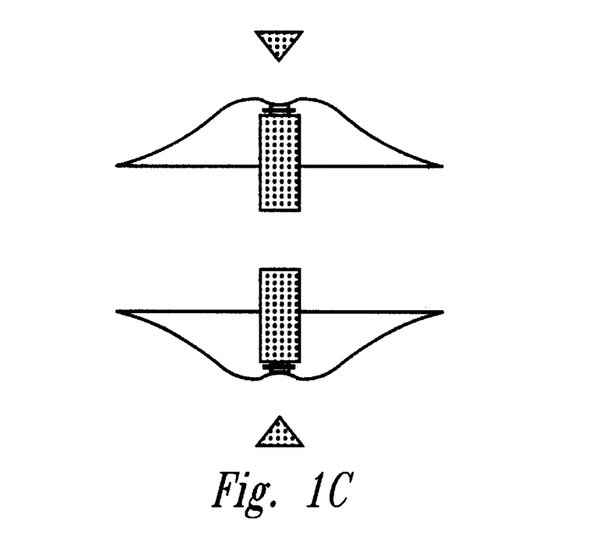
Figure 1D:
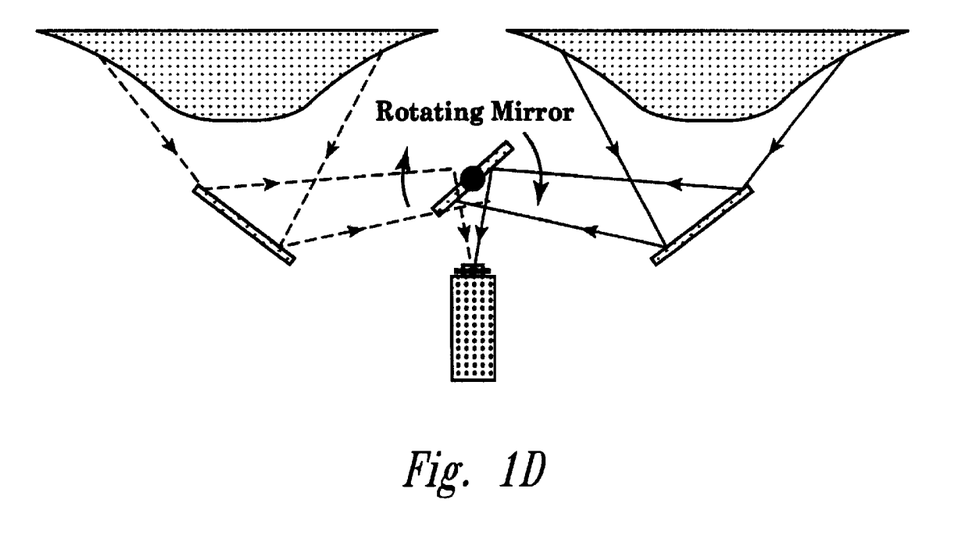
Figure 1E:
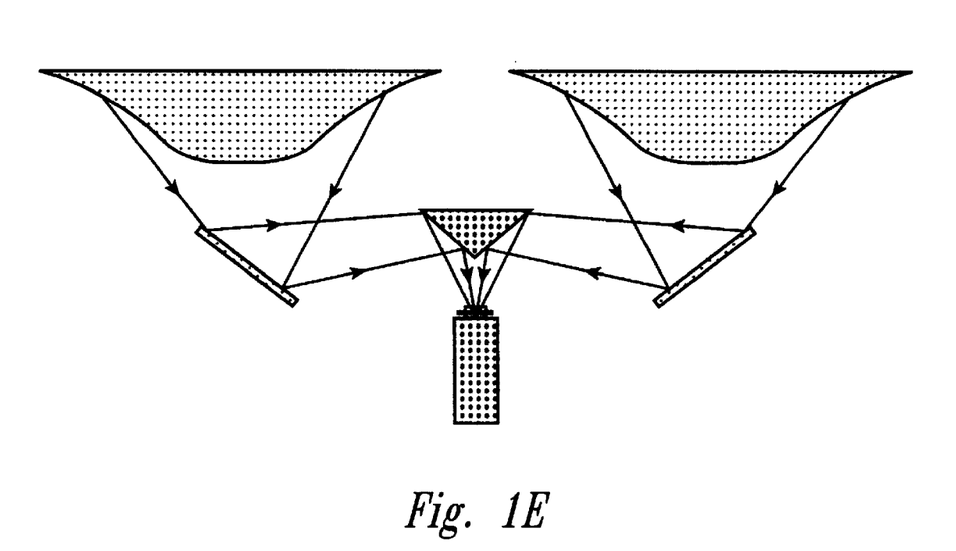
Figure 1F:
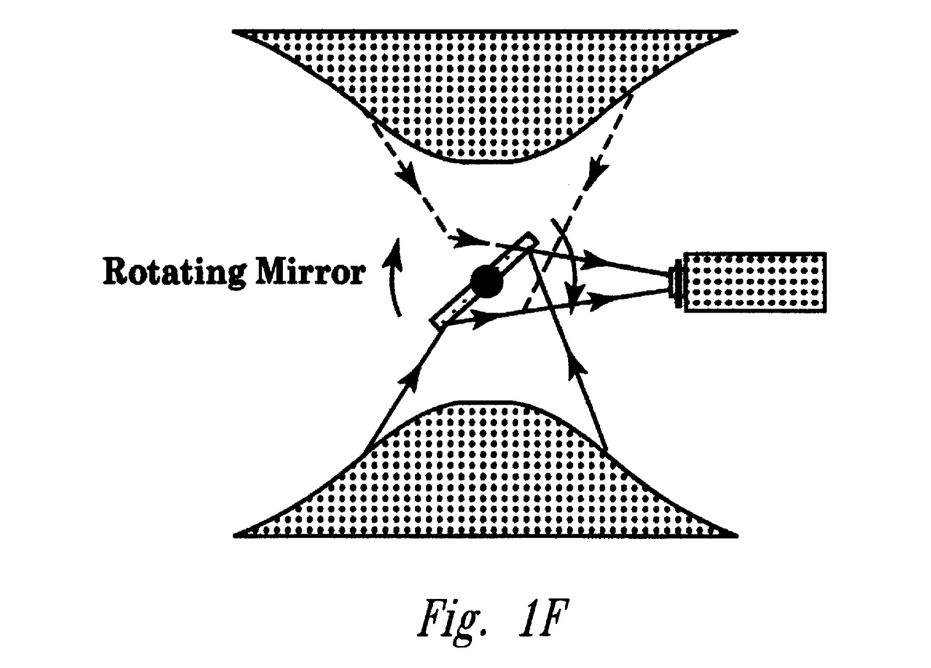
Figure 1G:
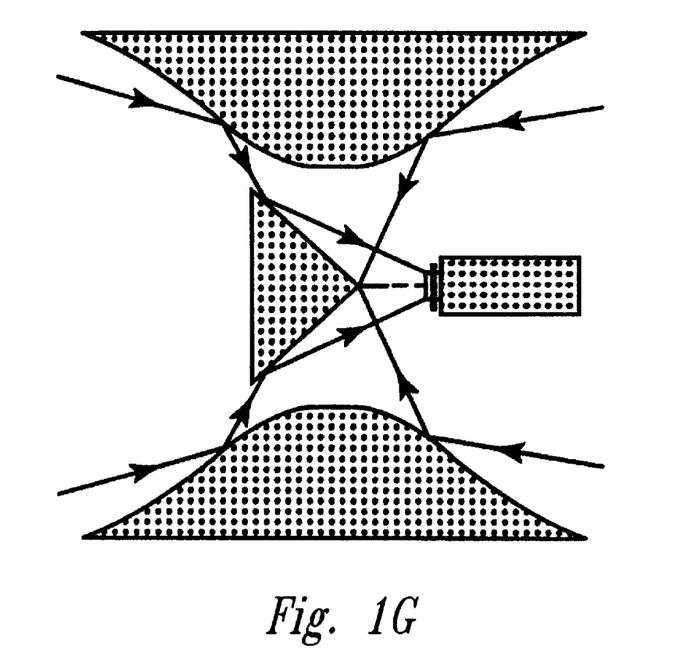

FIGS. 1A to 1G show a number of possible configurations utilising the panoramic imaging system of international patent application number PCT/AU97/00815 to capture two images for range determination. FIG. 1A shows a single camera that is moved through a known distance, or at known speed to capture the two or more images required for the range computation. FIG. 1A is also illustrative of two cameras at a fixed or known distance apart. FIGS. 1B and 1C show configurations with two surfaces and two cameras. FIGS. 1D and 1F show the capture of two views from two surfaces using a single camera and a moving mirror. FIGS. 1E and 1G show the capture of a single image that contains sub-image of two surfaces by using a split mirror.

Figure 2:
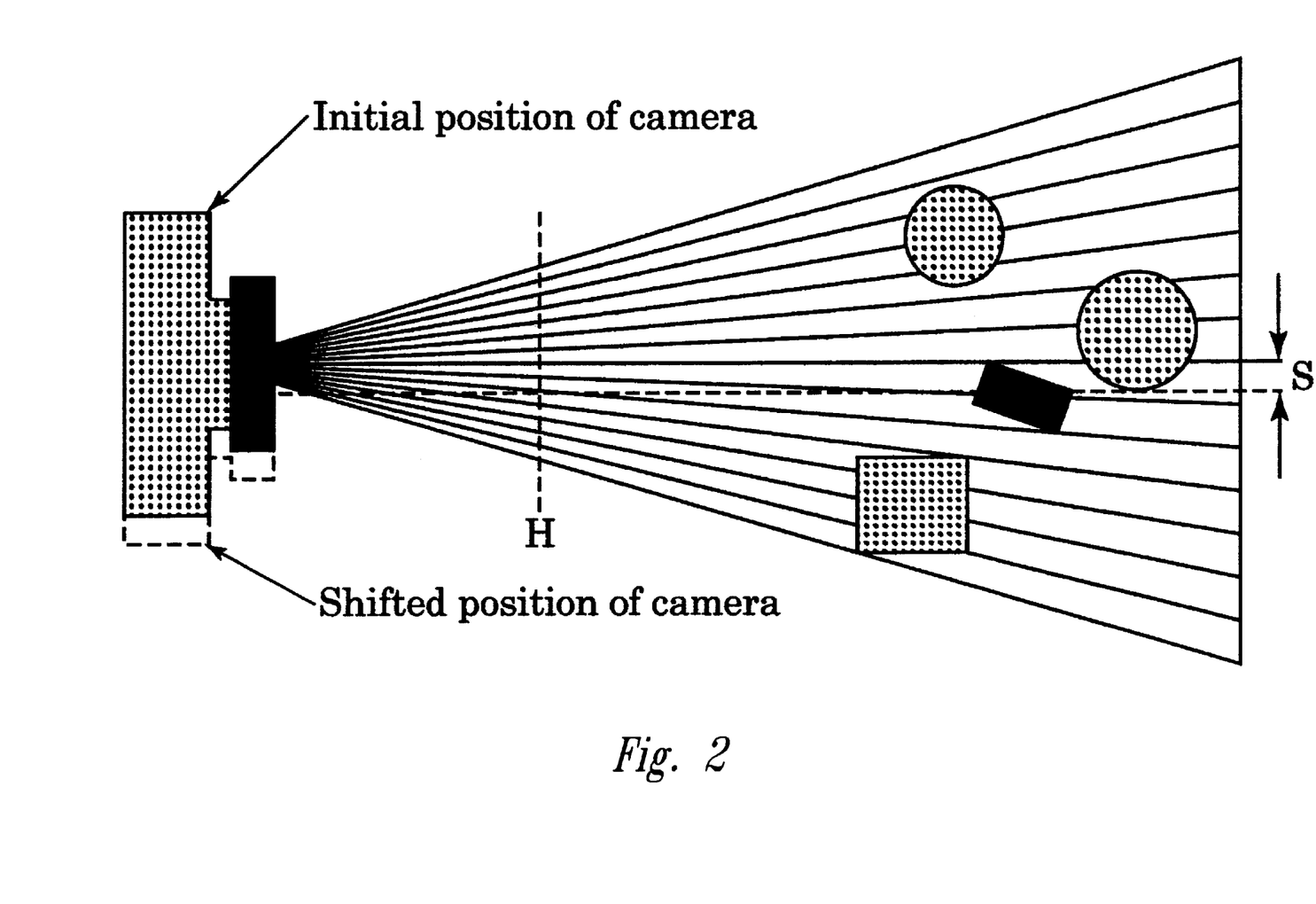
FIGS. 2 to 2C are schematic illustrations of a simplification of the method of measuring the range of an object according to this invention.
Figure 2A:
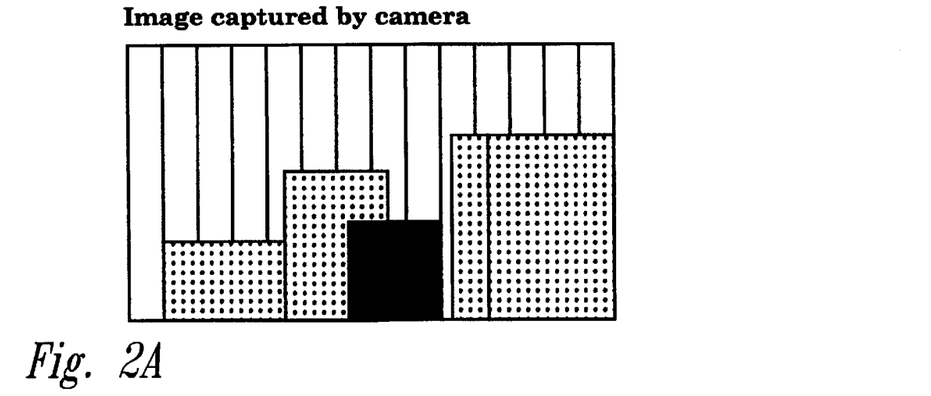
Figure 2B:
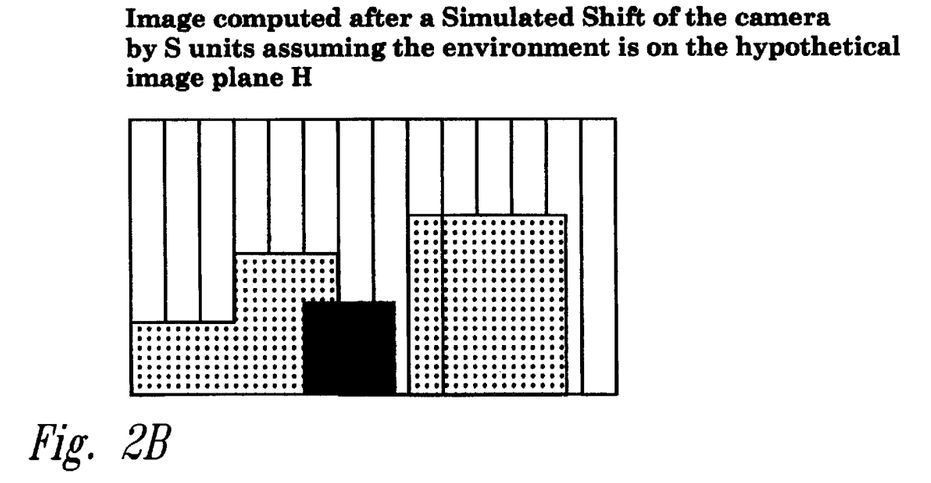
Figure 2C:
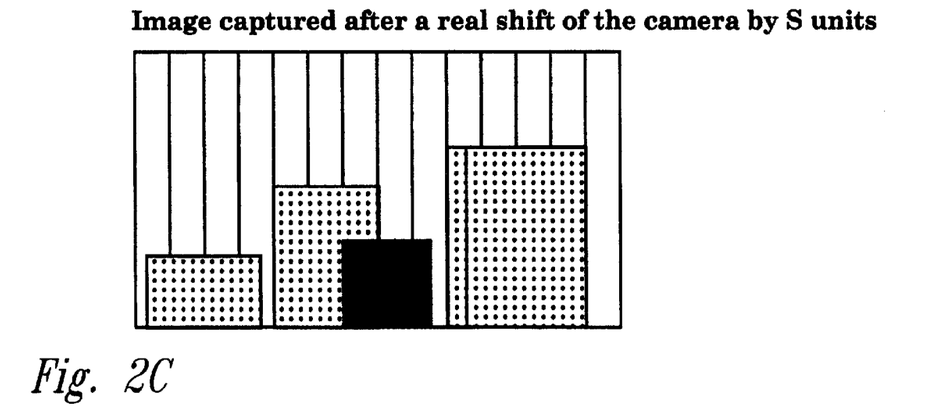

A single image provides no way of determining range since the only information available is pixel intensity at known angles. The environment that generates this output could be of any shape as long as the function of intensity with angle at the camera position matches that received by the camera. One way to consider the range to features in this environment is that everything is equal distance, that is, the world forms a spherical shell about the optical centre of the imaging device with a pattern received by the camera painted on the inside of the shell. FIG. 2 schematically shows a narrow field of view camera in which the image is interpreted as a plan at a fixed distance from the optical axis of the camera. The image formed by the camera is shown in FIG. 2A. If the structure that forms this image is assumed to be patterns of intensity that lie on the same plane, like a painting, the effect of the shift of the camera perpendicular to the scene is simply the same image homogeneously shifted horizontally as shown in FIG. 2B. When the camera is actually shifted the image that is produced is that shown at FIG. 2C and differs substantially from the hypothetical image due to the depth structure in the image. The image definition as between the calculated image and the actual image of the second position can be used to determine the range to the object.

Using a panoramic imaging system, the wide angles produce a wider field of view and the image produced is an angular rather than perspective projection. However, the same general concept applies. That is, it is possible to calculate a hypothetical shifted image from an original image, the size of the shift, and a chosen radius for the hypothetic sphere. If the radius is chosen such that it is smaller than the distance to any object likely to be in the environment, then all the motion "seen" when the shift is actually performed will be less than seen in the hypothetic spherical environment. Consequently the motion seen at any pixel in the image will vary between zero and at most the motion generated at that pixel by the hypothetic shift.

This information is particularly beneficial in using established algorithms for motion computation since there are large benefits from knowing the upper and lower bounds of the motion. Additionally, knowing the maximum shift allows the use of spatial filtering with filters are at least two times the width of the vertical shift to prevent aliasing. This allows optimization of the computational window required for processing and increasing the likelihood of achieving the correct result and decreasing the amount of computation that must be performed.

In correlation techniques the search base for motion computation can be narrowed to be less than the motion in the virtual image. Restricting the search base decreases the number of local comparisons and thus increases the speed of the operation.

In interpolation methods the direct comparison of the virtual image and the real image can be performed at every location thus yielding the motion in the image as a fraction of the motion of the virtual image. The range can be determined by dividing the radius of the virtual environment by the ratio of image motion to virtual image motion.

Some examples of the performance of the various steps in the method of determining range are now described.

The images used by the algorithm are one dimensional arrays of pixels, that represent intensity in equally spaced, slightly overlapping regions of space around the horizon. The images are defined on a one dimensional, circular (ring) array, the last element in the array being adjacent to the first.

Figure 3:
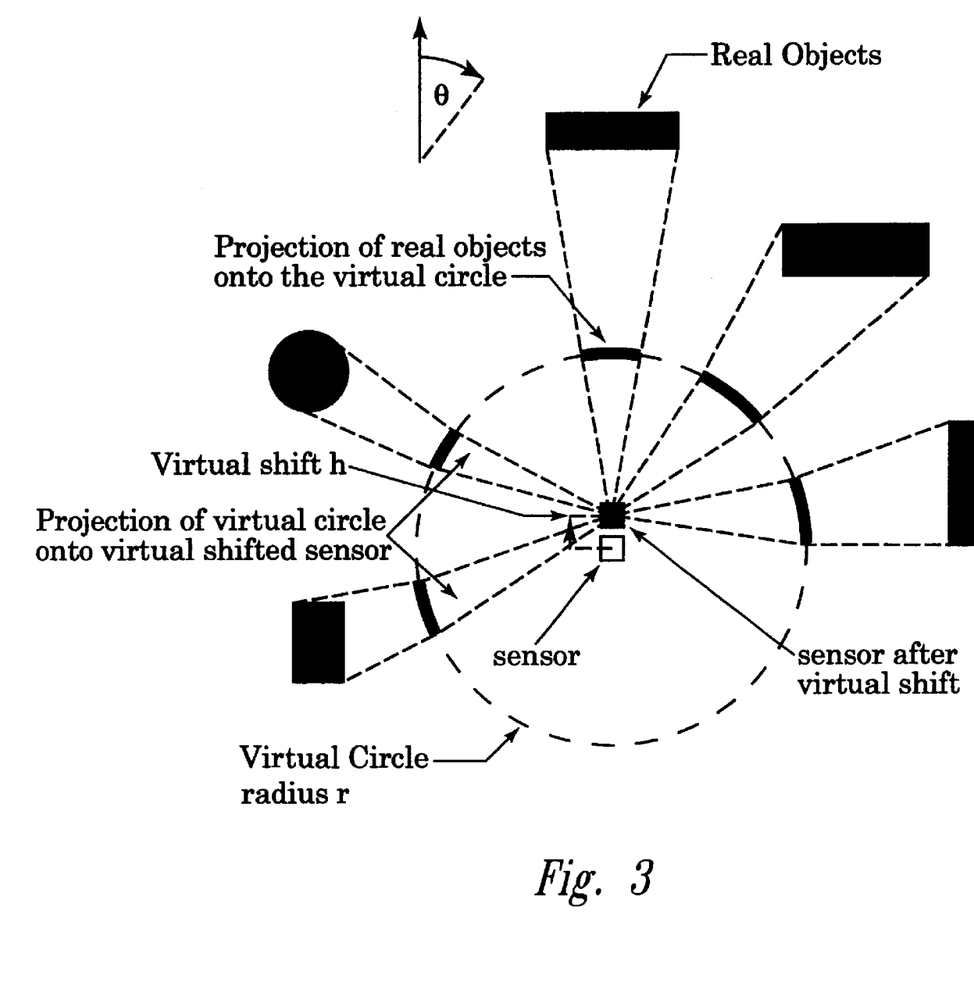
FIG. 3 is a schematic representation of the generation of an image used in the method of determining range according to this invention.
Figure 8:
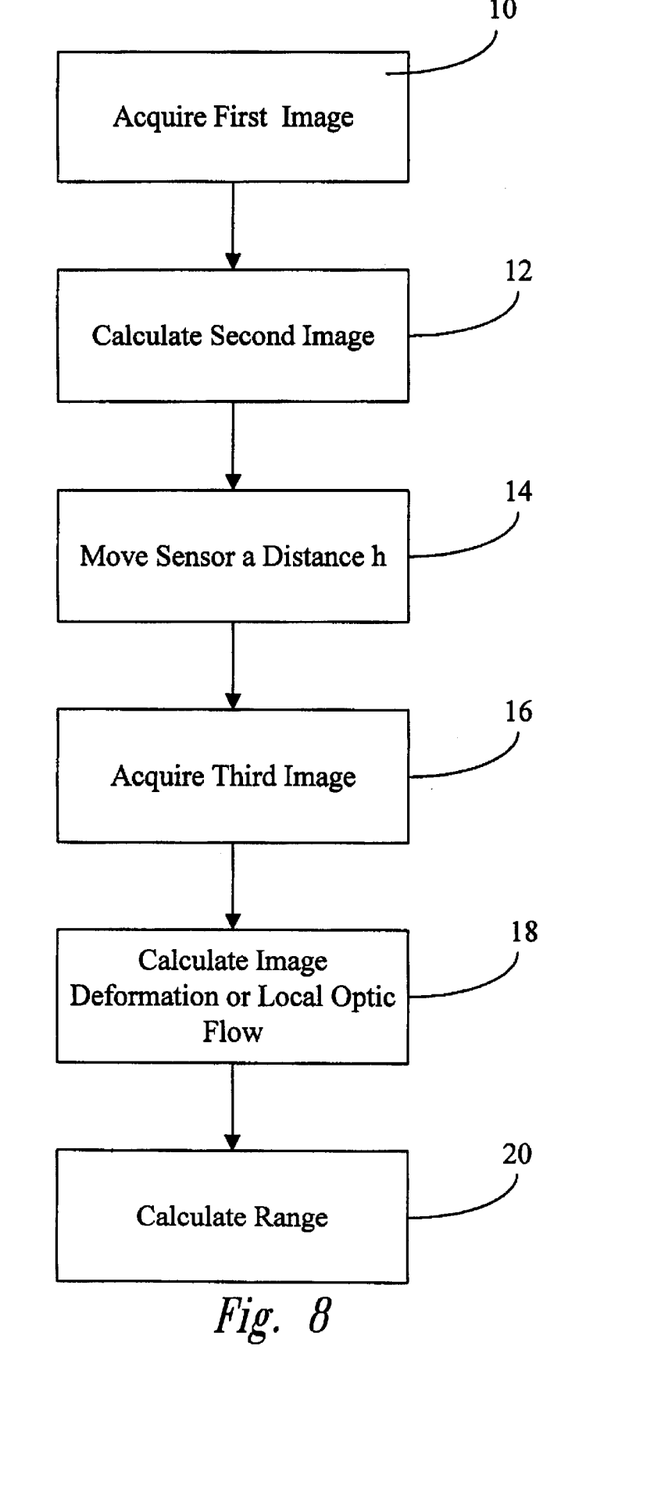
FIG. 8 shows a flow chart of a method according to the invention.

In the first stage of the algorithm, an image of $f_0(\theta)$ is acquired as the first reference image (step 10 of FIG. 8). A second reference image $f_1(\theta)$ is calculated, using $f_0(\theta)$ and the size of the sensor displacement (or for two sensors, the stereo baseline) h (step 12). This image is computed, not acquired. It is obtained by assuming that the environment surrounding the sensor at the first position is at a constant distance from the sensor in all azimuthal directions. Such a situation would prevail if the sensor were located inside a cylinder with an image of the environment painted around the inner surface. This surface is referred to as the virtual circle and a schematic illustration is shown in FIG. 3. The image that would be captured by the sensor after it is moved by a distance h, within the virtual circle (or radius r) is then computed as follows:

$$f_1(\theta) = f_0\left(\theta + \sin^{-1}\left(\frac{h}{r}\sin(\pi - \theta)\right)\right). \tag{1}$$

This image provides an upper-bound to the magnitude of image deformation that can occur at any location, assuming that no object in the environment lies within the virtual circle. (The radius of the virtual circle can be altered to allow for closer and more distant environments). The reference image obtained in this way is a computational device that allows a unified treatment of the entire panoramic image. By using the concept of a virtual circle, upper bounds for dilation, contraction, clockwise and anti-clockwise translation can be generated in a single step.

After acquiring the first reference image and computing the second reference image, the sensor is then moved through the same distance h, in the same direction (step 14). After the sensor motion, and image f(θ) of the environment is captured (step 16).

Range from Image Deformation

There are two ways of converting deformation measurements into range estimates. The first method is based on the fact that the amount of local image deformation is inversely proportional to range.

With reference to FIG. 3, let $\alpha(\theta)$ denote the fractional image deformation detected in a given viewing direction by the interpolation algorithm(step 18 of FIG. 8). Then it is clear that the range of the environment in this direction, R(θ) should be inversely proportional to $\alpha(\theta)$:

$$R(\theta) = \frac{r}{\alpha(\theta)} \text{ (step 20).} \tag{2}$$

where r is the radius of the virtual circle. When $\alpha(\theta)=1$, R(θ)=r. That is, the environment is at the same range as the virtual circle.

This expression represents the range to objects in the environment as measured from the initial position of the sensor (or from the position of sensor 1 in the case of a two-sensor arrangement). The range as measured from the final position of the sensor (or from sensor 2 in a two-sensor arrangement) is simply the expression in (2) minus the vector describing the positional shift of the sensor $$R(\theta) = \frac{r}{\alpha(\theta)} - h\cos(\theta)$$

Clearly, if the displacement h is small compared to the radius of the virtual circle r, the range as measured from the two sensor positions should be the same. When $$\frac{h}{r} \ll 1,$$

the second solution reduces to equation (2):

$$\frac{r}{\alpha(\theta)} - h\cos(\theta) = r\left[\frac{1}{\alpha(\theta)} - \frac{h}{r}\cos(\theta)\right] \approx \frac{r}{\alpha(\theta)}$$

Range from Image Motion

Figure 4:
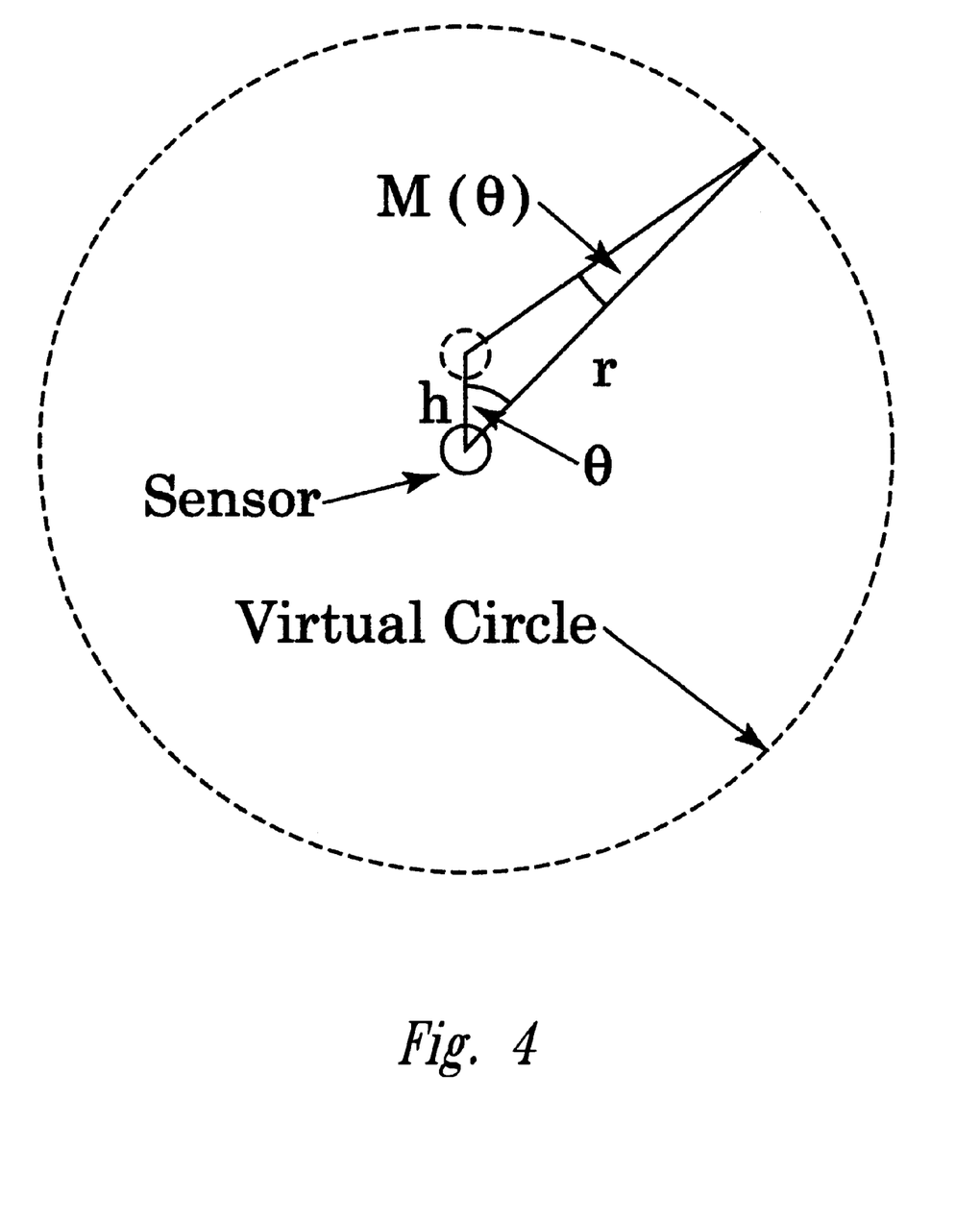
FIG. 4 is a schematic illustration of a method of calculating local optic flow forming part of the method of this invention.

The second method computes local optic flow (i.e. local angular image translation) (step 18), and uses this information to determine range by triangulation (step 20). In this case, the calculation proceeds as follows. If M(θ) is the optic flow seen in the direction θ between the reference images $f_0(\theta)$ and $f_1(\theta)$, it can be shown with reference to FIG. 4 that $$M(\theta) = \sin^{-1}\left(\frac{h\sin(\theta)}{\sqrt{r^2 + h^2 2rh\cos(\theta)}}\right). \tag{3}$$

The normalised local motion $\alpha(\theta)$, computed by the interpolation algorithm results from an optic flow in the image equal to $\alpha(\theta)$ M(θ). It can be shown that the range profile R in a given direction θ as measured from the original position of the camera (or camera 1 if two cameras are used) is given by $$R(\theta) = \frac{h\sin(\theta + \alpha(\theta)M(\theta))}{\sin(\alpha(\theta)M(\theta))} \tag{4}$$

Similarly it can be shown that, the range profile as measured from the final position of the sensor (or from sensor 2) is given by $$R(\theta) = \frac{h\sin(\theta)}{\sin(\alpha(\theta)M(\theta))} \tag{5}$$

Clearly when $$\frac{h}{r} \ll 1,$$

the range measured from sensors 1 and 2 should be the same. This can be shown as follows. For $$\frac{h}{r} \ll 1,$$

we may rewrite (3) as $$M(\theta) \approx \sin^{-1}\left(\frac{h}{r}\sin(\theta)\right) \approx \frac{h}{r}\sin(\theta)$$

Substituting for M(θ) into (4), we obtain $$R(\theta) \approx \frac{h\sin\left(\theta + \alpha(\theta)\frac{h}{r}\sin(\theta)\right)}{\sin\left(\alpha(\theta)\frac{h}{r}\sin(\theta)\right)} \approx \frac{h\sin(\theta)}{\sin(\alpha(\theta)M(\theta))} \tag{6}$$

which is identical to (5).

It can also be shown that, under these conditions, the image deformation method yields the same results as the optic flow method. To show this, we note that (6) can be rewritten as $$R(\theta) \approx \frac{h\sin(\theta)}{\sin\left(\alpha(\theta)\frac{h}{r}\sin(\theta)\right)} \approx \frac{h\sin(\theta)}{\alpha(\theta)\frac{h}{r}\sin(\theta)} \approx \frac{r}{\alpha(\theta)} \tag{7}$$

which is identical to the expression obtained from the image deformation method (step 20).

Comparison of deformation and optic flow for computing range.

When using the optic flow method no motion is visible at or near the poles of motion, leading to a range defined by the indeterminate ratio %.

This effect might be avoided by having motion detectors pointing slightly to the left and right of the motion pole, but then no reading is available for the pole. It is clear that the image deformation method offers a simple way of circumventing this problem, in that it measures image expansion or contraction in a region of finite extent centred on the pole. However, even this method cannot be expected to produce very accurate results for distant objects near the poles, because the resulting expansions or contractions will be small.

The two methods yield almost identical results for realistic values of h and R.

Image Interpolation Algorithm.

The image interpolation algorithm is used to compute the local image deformation around the array, due to the shift (step 18). This algorithm computes the fractional deformation between $f_0(\theta)$ and $f_1(\theta)$, relative to the deformation between $f_1(\theta)$ and $f_0(\theta)$. It assumes that for small displacements of the sensor, $f(\theta)$ can be approximated by $\hat{f}(\theta)$, a weighted linear combination of $f_0(\theta)$ and $\hat{f}(\theta)$ $$\hat{f}(\theta) = f_0(\theta) + \alpha(f_1(\theta) - f_0(\theta)) \quad (8)$$

where the weighting variable $\alpha$ specifies the fractional deformation of $f_0(\theta)$ in going from $f_0(\theta)$ and $f_1(\theta)$.

The value of $\alpha$ for which $\hat{f}(\theta)$ best approximates $f(\theta)$ is determined by minimizing the integral squared error between $\hat{f}(\theta)$ and $f(\theta)$ as follows.

$$\int_0^{2\pi} \psi(\theta) [\hat{f}(\theta) - f(\theta)]^2 d\theta = \int_0^{2\pi} \psi(\theta) [f_0(\theta) + \alpha(f_1(\theta) + f_0(\theta)) - f(\theta)]^2 d\theta$$

where $\psi$ is a weighting function that restricts the area of interest of the error computation to a region centred around the direction in which range is to be determined. Minimising this expression with respect to $\alpha$ yields the following expression for $\alpha$ $$\alpha = \frac{\int_0^{2\pi} \psi(\theta)[f(\theta) - f_0(\theta)](f_1(\theta) - f_0(\theta)) d\theta}{\int_0^{2\pi} \psi(\theta)[f_0(\theta) - f_1(\theta)]^2 d\theta} \quad (9)$$

The interpolation algorithm is useful for computing range in this case because it measures general image deformation within the space defined by the two reference images, rather than just simple translation. This is important because the type of deformation is different at different directions around the image. For example, the region of the image in the direction of sensor motion undergoes dilation, whereas the region of the image orthogonal to the direction of motion undergoes simple translation.

Alternate Image Interpolation

In the following description a knowledge of the terms below is required.

Kernel A function of a particular shape that is used with the convolution operator to modify the properties of the signal in the frequency domain eg. smear sharp edges or increase contrast at sharp edges or to emphasize/de-emphasize small objects.

Convolution Convolution is the fundamental tool of image processing and communications systems. We will use the symbol $\otimes$ to denote the convolution operation. Convolution of two functions in the same variable, for example $v(x)$ and $w(x)$ is defined as follows:

$$v(x) \otimes w(x) \equiv \int_{-\infty}^{\infty} v(\lambda) w(x - \lambda) d\lambda$$

In image processing the signal v and kernel w are two dimensional and bounded in space the result is generally programmed as follows:

$$v(x,y) \otimes w \equiv \sum_{j=-\frac{k_y}{2}}^{\frac{k_y}{2}} \sum_{i=-\frac{k_x}{2}}^{\frac{k_x}{2}} v(x+i, y+j) w\left(\frac{k_x}{2} - i, \frac{k_y}{2} - j\right)$$

Where $k_{x,y}$ are the maximum extent of the kernel in the x and y dimensions.

Separable Convolution Convolution of a two dimensional signal ($v(x,y)$) with a two dimensional kernel ($w(x,y)$) can be greatly accelerated if the kernel can be expressed in terms of two orthogonal one dimensional filters. This result is useful because it reduces the number of operations required to do a convolution from $n*k^2$ to $n*2*k$ where k is the length of the kernel in one dimension, and n is the number of pixels in the image. In this case convolution can be expressed as $$v(x,y) \otimes w(x,y) \equiv (v \otimes w_x(x)) \otimes w_y(x)$$

where $w(x,y) = w_x(x) \cdot w_y(y)$

Image Interpolation Algorithm

The image interpolation algorithm can be expressed compactly as a series of convolutions and pixel arithmetic instructions. $f_0$ is a first reference image, $f_1$ is a simulated second reference image, and f is an image at an unknown position. $\rho$ is an image containing the apparent motion at each point of the image f, normalised to the distance between $f_0$ and $f_1$ $$\rho = \frac{\psi \otimes [\phi \otimes (f - f_0) \cdot \phi \otimes (f_1 - f_0)]}{\psi \otimes [\phi \otimes (f_1 - f_0)]^2}$$

The unwarped image A coordinate transform from rectangular to polar that eliminates the need for many trigonometric computations, by converting azimuthal angle about the optical axis of the image into the "x" axis of the image, and elevation into the "y" axis.

Algorithms for image processing depend heavily on convolution, as can be seen from the interpolation algorithm above. Unfortunately the image produced by the surfaces described in international application number PCT/AU94/00501 and international patent application number PCT/AU97/00815 and any similar implementation that makes use of curbed mirrors to obtain wide fields of view can not be filtered separably.

Figure 5A:
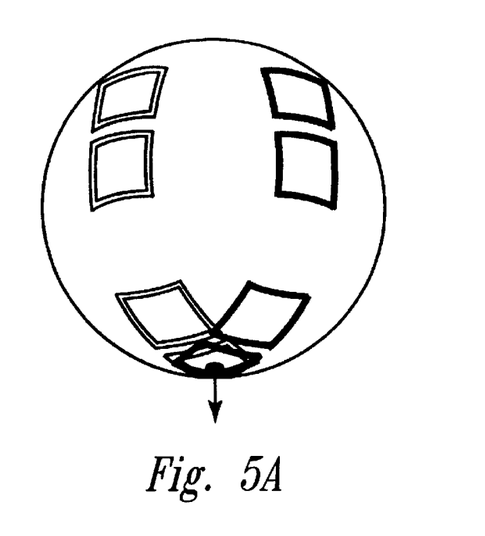
FIG. 5A shows mapping onto the world sphere.
Figure 5B:
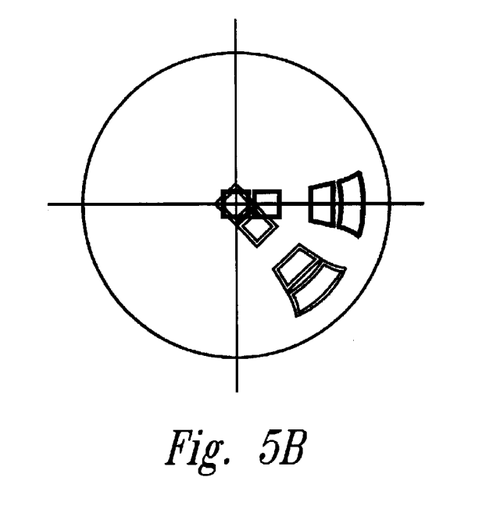
FIG. 5B shows mapping onto different parts of an image from a camera.

The correct way to think about filtering panoramic images is to consider the image of the environment to have been acquired from a spherical shell centred on the centre of projection. Then consider the filter to be a fixed size region of space that moves around the virtual shell as shown in FIG. 5A. As the filter moves around on the shell, its projection onto the panoramic image captured by the camera will change as shown in FIG. 5B. This is due to changes in azimuthal resolution that occur at different elevations. This is unavoidable in any such surface or optical arrangement other than those that produce a normal perspective projection or a true spherical image, with constant angular resolution in each dimension at all points.

The image that would be captured by a camera directly viewing one of these surfaces is not suitable for image processing as only lines radiating outward from the centre of the image are (approximately) orthogonal to lines tangential to the optical axis. This means that to achieve uniform filtering, each kernel would have to be rotated about the optical axis before attempting computation. This would also restrict processing to non separable convolutions, with a large overhead of trigonometric operations in mapping the filter into image space.

Figure 5C:
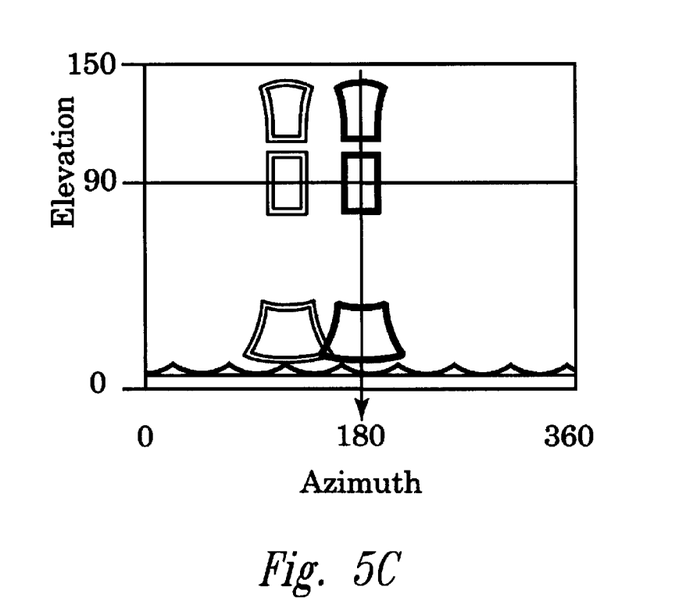
FIG. 5C shows mapping onto the unwarped image.

This difficulty can be partly alleviated by producing an unwarped image where the vertical axis represents angular elevation, and the horizontal axis represents azimuth. Now it is known that rotation about the optical axis will map into a translational motion along the horizontal axis, and that changes in elevation angle will result in translation by a constant distance along the vertical axis. This transformation reduces some trigonometric operations to simple additions and subtractions as shown in FIG. 5C.

Unfortunately the amount of space actually represented by each line on the horizontal axis is not constant. An extreme case is the "South Pole" of space, which is only a single pixel in size, but maps to an entire line in the unwarped image, the same applies to the "North Pole". It will be seen that latitude and longitude through any point on the shell do not transform to mutually orthogonal curves in the transformed image. Orthogonality holds only at the horizon, where elevation is 90 degrees. However, part of the image processing problem is solved, as the filter can be mapped from the shell (ie. outer space) on to the transformed image, and a two dimensional convolution can be performed with the transformed filter. Only one filter would need to be computed for each row and then this filter could be shifted along the X axis (which is the same as rotation about the optical axis). However this operation is still of computational order $n^2$ which is a significant barrier to real implementation.

Orthogonality between the two filter axes on the original image is present at the intersection of two orthogonal great arcs (arcs of the same diameters as the world sphere, and whose centre is the origin of the coordinate system). The positions of the two chosen arcs are parameterised as follows referring to FIG. 6.

Figure 6:
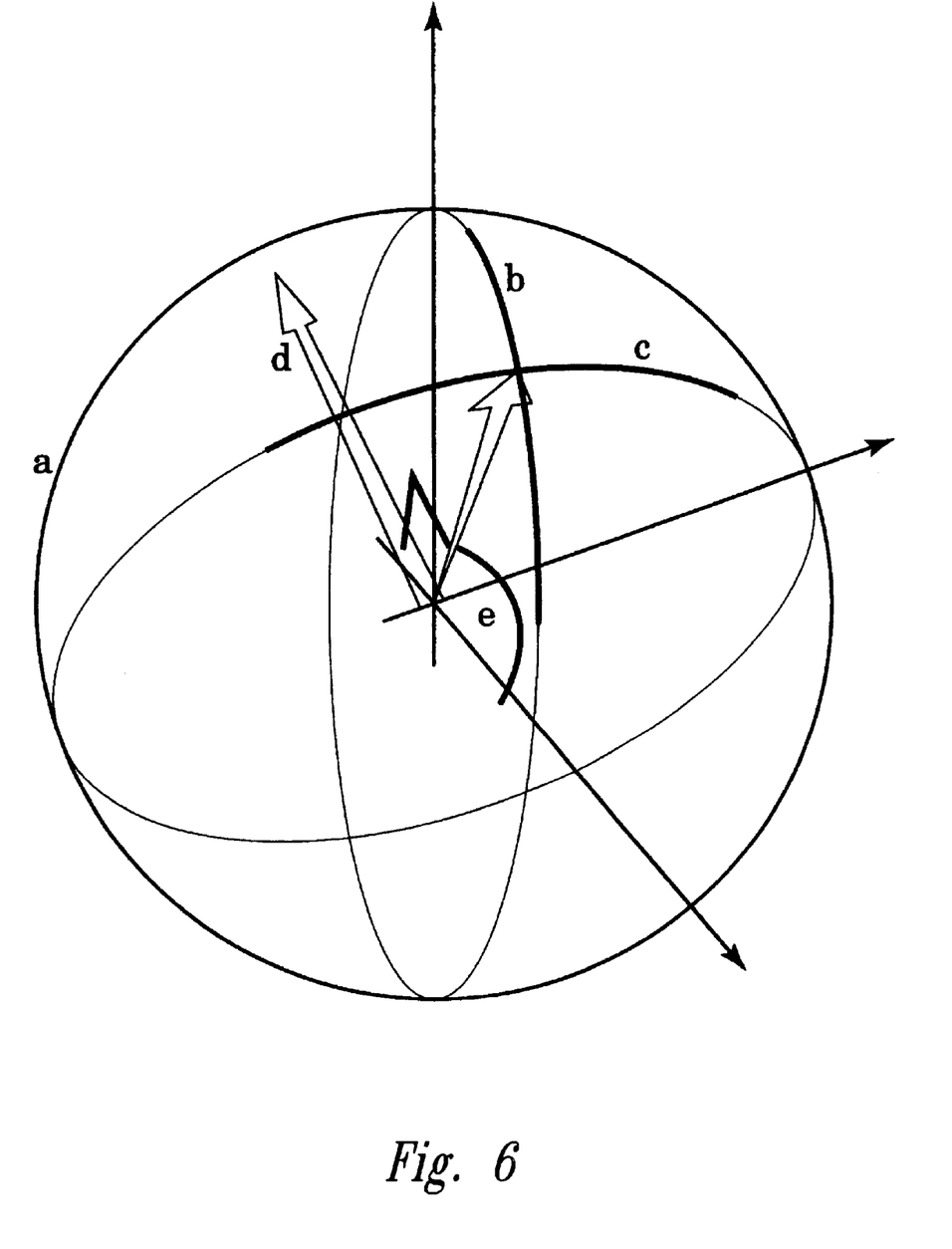
FIG. 6 shows the orientation of selected great arts on a world sphere.

One great arc b is oriented in the vertical direction, thus passing through each pole, and rotated about the vertical axis depending on the azimuthal position of the pixel on which the operation is to be centred.

The other great arc c is designed to pass through the pixel at a given angle of elevation e, while being orthogonal to the vertical great arc. It is simply a horizontally oriented arc that has been rotated to the same angle of elevation as the centre of the filter. This means that the second arc does not always correspond to a horizontal line in the unwarped image. Rather, it is a curve.

The vertical great arc on the shell (ie. longitude) corresponds to vertical lines in the unwarped image.

The great arc orthogonal to the longitudinal great arc is computed for each row in the unwarped image (arcs at different azimuthal angles are just horizontally shifted versions of the curves at 0° azimuth in the unwarped image). This arc is a curve of angular length determined by the angular width of the filter. The curve is stored in a multi-dimensional array containing the magnitude of the kernel at that point, and the horizontal and vertical offsets of each element of the filter from the pixel at the centre of the filter. The points along the curve are sampled uniformly in angle about the axis of the arc d (but not uniformly in transformed image space).

Figure 7:
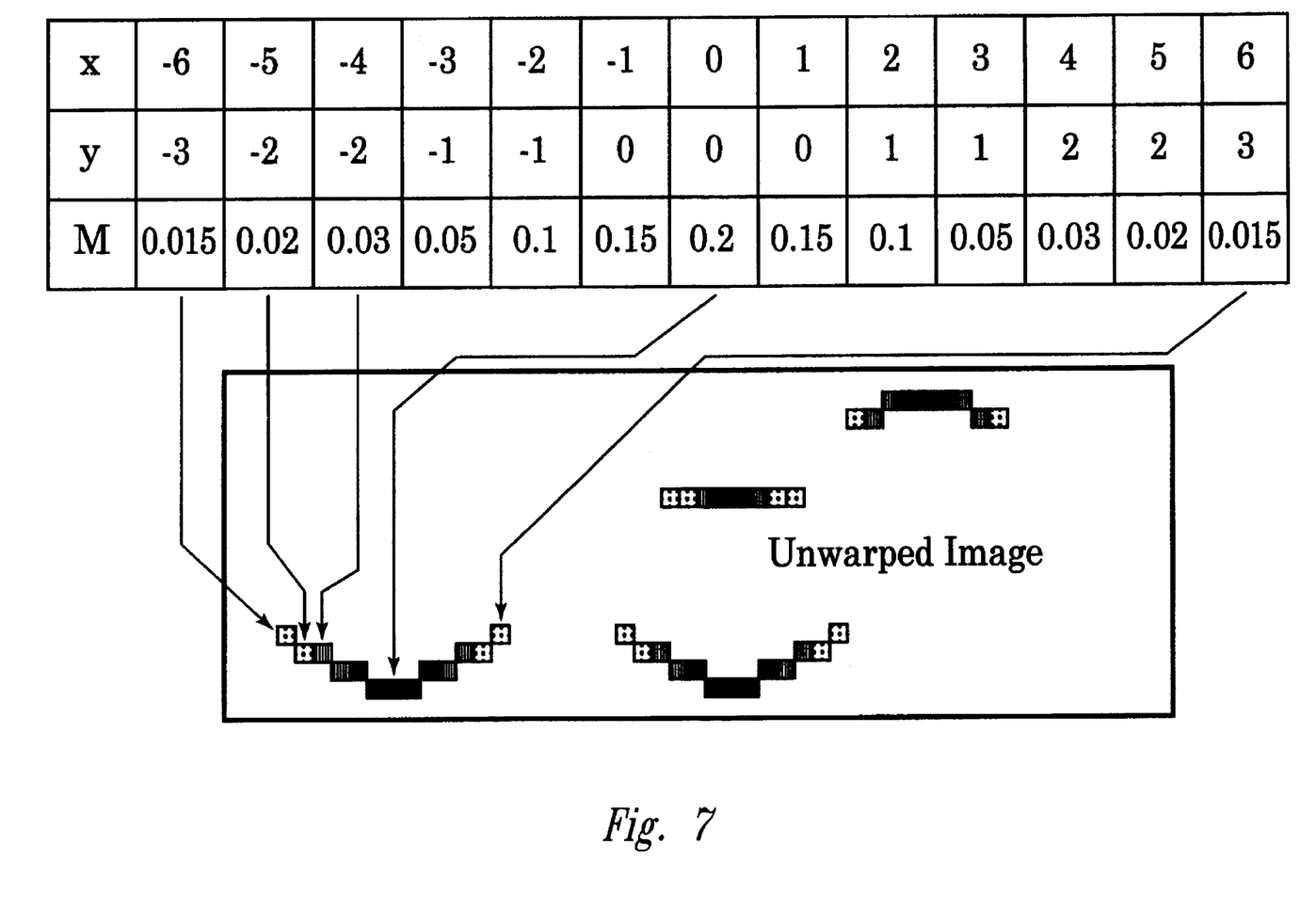
FIG. 7 shows a look up table and the corresponding locations on an unwarped image.

The procedure for convolution in an unwarped image is first to convolve each point in the image with the non-vertical one dimensional curves described above, $$r_x(x, y) = v(x, y) \otimes w(y, \theta)$$

$$= \sum_{\theta=-\frac{k}{2}}^{\frac{k}{2}} v_x(x + w_x(y, \theta), y + w_y(y, \theta))w_m(\theta)$$

where $r_x$ is the interim result after convolution only in the non-vertical direction. v is the image, w is a multidimensional array: $w_x$ is the list of X axis offsets for individual elements of a filter at a given elevational angle (directly proportional to y in the unwarped image), $w_y$ is a list of Y axis offsets, and $w_m$ is the magnitude of the kernel at the point indexed by $_x(w_y,w)$. The indexing of w represents angular position about the axis of the non-vertical great arc, it does not, therefore, correspond to equal intervals on the unwarped image as shown in FIG. 7.

A lookup table that describes the shape of a segment from a great arc along which a one dimensional kernel is defined, and its weighting for a single row of the unwarped image. The table is indexed in equal angular divisions about the rotational axis of the great arc. The pixel locations are defined in terms of the offsets on the horizontal and vertical axes of the unwarped image from the pixel at the centre of the filter.

Following this operation, the image has been filtered in the non-vertical direction. As angular distances in the elevational direction are constant for the surfaces described in international application number PCT/AU94/00501 and international patent application number PCT/AU97/00815, the resulting image can be convolved in the elevational direction (the y axis in the unwarped image) with a vertically oriented, one dimensional filter of the same angular size as that used in the operation above. Only one filter is needed for vertically filtering the entire image, in this particular case.

If a surface without the constant elevational resolution property were used, a differently scaled vertically oriented filter would be used at each row.

In the above description it is assumed that geometrically correct account is taken of the behaviour of filters on the edge of the image.

This technique achieves uniform (homogeneous) filtering of a digital panoramic image in an efficient way. The technique makes extensive use of look up tables and simplifying transformations to massively accelerate the process of convolution, which is vital to correctly computing range from panoramic images.

Figure 9:
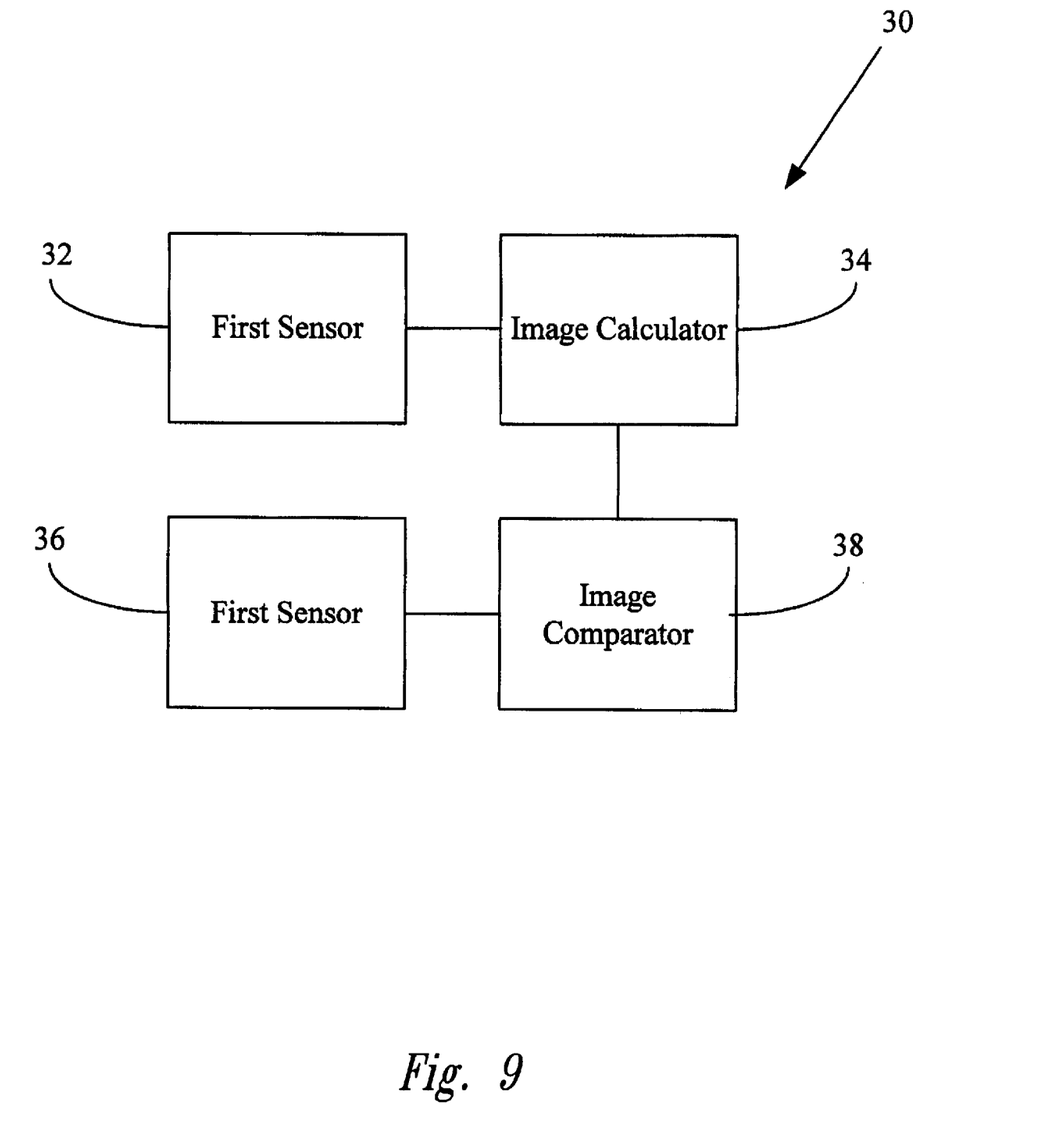
FIG. 9 shows a block diagram of an apparatus according to the invention.

An apparatus 30 for determining the range of an object is shown in FIG. 9. The apparatus includes means 32 to generate a first image of at least a portion of the object viewed from a first position; calculating means 34 to produce a second image of said portion viewed from a second position spaced apart from the first position by calculation from said first image using the distance between said first and second positions and assuming all of the portion represented by said first image lies on an arc of constant radius less than the distance to the object; means 36 to generate a third image of the portion viewed from said second position; and comparator means 38 to determine the range of the object from said second and third images.

The foregoing describes only some embodiments of the invention and modifications can be made without departing from the scope of the invention.

Throughout this specification, unless the context requires otherwise, the word "comprise", or variations such as "comprises" or "comprising", will be understood to imply the inclusion of a stated integer or group of integers but not the exclusion of any other integer or group of integers.

What is claimed is:

1. A method of determining the range of an object including the steps of generating a first image of at least a portion of the object viewed from a first position, producing a second image of said portion viewed from a second position spaced apart from the first position by calculation from said first image using the distance between said first and second positions and assuming all of the portion represented by said first image lies on an arc of constant radius less than the distance to the object, generating a third image of the portion viewed from said second position, and determining the range of the object by comparison of said second and third images.

2. A method as claimed in claim 1 further including the steps of generating the first and third images by moving the effective position of the image generator from the first position to the second position.

3. A method as claimed in claim 1 wherein the first and third images are respectively generated by two separate image generators of identical configuration at each of the first and second positions.

4. A method as claimed in claim 1 wherein the first and third images generated using a panoramic imaging system.

5. A method as claimed in claim 4 wherein the images are a circular array representing an image space around a horizon.

6. A method as claimed in claim 5 wherein the images are a one dimensional array of pixels that represent intensity in equally spaced regions around a horizon.

7. A method as claimed in claim 6 wherein said regions are slightly overlapping.

8. A method as claimed in claim 1 wherein the determination of range is made from a comparison of the deformation between the second and third images using the relationship that local image deformation is inversely proportional to range.

9. A method as claimed in claim 1 wherein the local optical flow is determined from the first and second images and the range determined by triangulation.

10. An apparatus for determining the range of an object including means to generate a first image of at least a portion of the object viewed from a first position, calculating means to produce a second image of said portion viewed from a second position spaced apart from the first position by calculation from said first image using the distance between said first and second positions and assuming all of the portion represented by said first image lies on an arc of constant radius less than the distance to the object, means to generate a third image of the portion viewed from said second position, and comparator means to determine the range of the object from said second and third images.

11. An apparatus as claimed in claim 10 wherein the first and third images are generated by moving the effective position of the image generator from the first position to the second position.

12. An apparatus as claimed in claim 10 wherein the first and third images are respectively generated by two separate image generators of identical configuration at each of the first and second positions.

13. An apparatus as claimed in claim 10 wherein the first and third images are generated using a panoramic imaging system.

14. An apparatus as claimed in claim 13 wherein the images are a circular array representing an image space around a horizon.

15. An apparatus as claimed in claim 14 wherein the images are a one dimensional array of pixels that represent intensity in equally spaced regions around a horizon.

16. An apparatus as claimed in claim 15 wherein said regions are slightly overlapping.

17. An apparatus as claimed in claim 10 wherein the determination of range is made from a comparison of the deformation between the second and third images using the relationship that local image deformation is inversely proportional to range.

18. An apparatus as claimed in claim 10 wherein the local optical flow is determined from the first and second images and the range determined by triangulation.

* * * * *